Oct. 2, 1923.
H. Q. R. CROWDER
1,469,554
DRAWING SHEET AND METHOD OF MAKING SAME
Filed April 13, 1922
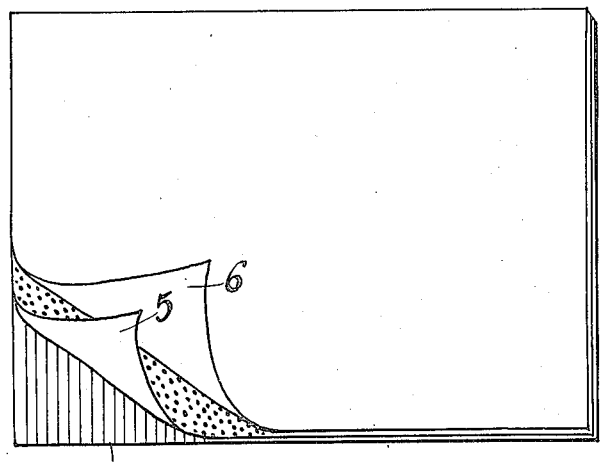
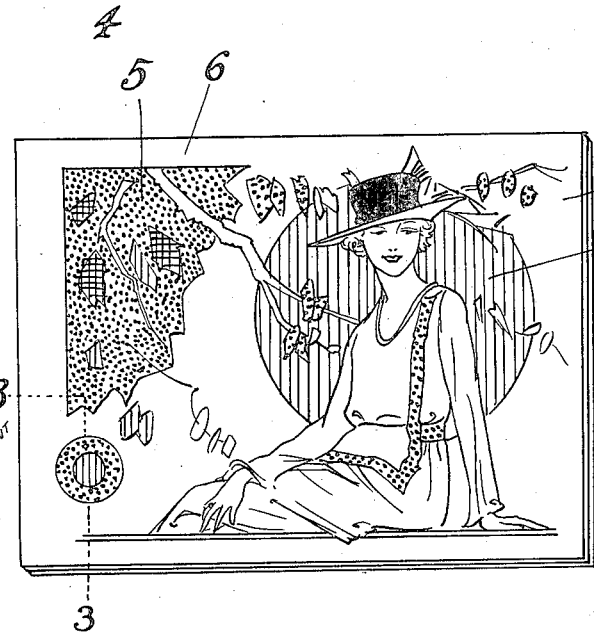

Patented Oct. 2, 1923.

1,469,554

UNITED STATES PATENT OFFICE.

HAVY Q. R. CROWDER, OF CHICAGO, ILLINOIS.

DRAWING SHEET AND METHOD OF MAKING SAME.

Application filed April 13, 1922. Serial No. 552,320.

*To all whom it may concern:*

Be it known that I, HAVY Q. R. CROWDER, a citizen of the United States, residing at Chicago, in the county of Cook and State of Illinois, have invented certain new and useful Improvements in Drawing Sheets and Methods of Making Same, of which the following is a specification.

My invention relates to drawing sheets and has for one of its objects the provision of a simple and efficient drawing board or paper particularly adaptable for easily and quickly making pictures for advertising cuts, and the like.

A further object is the provision of a simple and efficient method for making pictures.

A further object is the provision of a drawing paper or board made up of a plurality of sheets with artistic matter on the underlying sheets for furnishing various parts of a complete picture when the upper sheets are cut away.

A further object is the provision of an efficient adhesive for securing the sheets or plies of my improved drawing board together.

Other objects will appear hereinafter.

An embodiment of my invention is illustrated in the accompanying drawing forming a part of this specification and in which—

Fig. 1 is a view in perspective of a piece of drawing board made in accordance with my invention and in which the plies thereof at a corner are separated to show their relations;

Fig. 2 is a similar view of a drawing board having a complete picture thereon, made in accordance with my invention; and Fig. 3 is a fragmental section taken on line 3—3 of Fig. 2.

Heretofore various methods and means have been used to produce drawings suitable for making cuts for advertising matter, and the like. In some of these methods the drawing board or paper is first prepared with the background or other parts of the picture thereon and then the main part of the picture made on such background, etc. Oftentimes these backgrounds are of very fine lines or stipplings close together, which tend to cause fatigue in the eyes of the artist. This makes such papers quite hard to work on. With my improved drawing board and process for making drawings the artist makes his picture on a white or other plain surface where there are no lines or configurations which interfere with his vision during the making of his picture.

My improved drawing board is made up of a plurality of sheets or plies, 4, 5 and 6 which are secured together as indicated. The sheet 6 which is uppermost is made plain so that the artist can make his picture on it in the usual manner of using plain drawing boards or papers. After he has finished the part of his picture which he intends to make, he takes a sharp knife, not shown, and cuts out portions of the top of sheet 6 or sheets 6 and 5 to expose desired portions of the under sheets. These sheets 4 and 5 are prepared with configurations which will represent the kind of background or other parts of the picture desired. If he wants the kind of background on sheet 5, he simply cuts through sheet 6, where desired, and removes the pieces cut around to expose the proper portions of sheet 5. If he desires to show the configurations on sheet 4 he cuts through sheets 6 and 5 where desired and removes the pieces.

Referring to Figs. 1 and 2 it will be apparent that the parallel lines in the circular background adjacent the picture of the lady's head is the configuration shown on sheet 4 of Fig. 1, and to expose sheet 4 portions of sheets 5 and 6 have been cut out and removed. Near the upper left-hand corner of the picture of Fig. 2 the stipple background is shown, and to expose this background sheet 6 only would have been cut and portions removed.

It will be apparent that a fewer or greater number of sheets may be secured together as desired and that any kind of configurations may be formed on said sheets.

Sheets 4, 5 and 6 may be secured together in any desirable manner, such as by using a suitable adhesive which will hold the sheets firmly together and still permit the cut-out portions to be easily removed. I find that by taking pure rubber cement as found on the market, which is used by draftsmen and artists, and adding thereto 6% of ordinary sewing machine oil and then thinning the mixture of rubber cement and sewing machine oil with benzine so that it flows freely from a brush or pasting machine, a very desirable adhesive is formed. I do not desire to be confined to this particular adhesive, but find that when this adhesive is used to secure the sheets, the parts cut out can be easily peeled off and that the remaining portions of the sheets will remain firmly together. This adhesive will permit the drawing board or paper to be used a long time after having been manufactured and still permit the cut-out portions to be removed easily. The oil and benzine tend to weaken the rubber cement and therefore the quantity used may be varied under different circumstances to accomplish desired results.

I claim:—

1. A drawing card comprising a plurality of sheets secured together in stacked relation, all of said sheets except the topmost sheet having artistic back ground matter thereon and openings in certain sheets exposing portions of the back ground matter on said sheets, the exposed back ground matter and picture matter on the topmost sheet cooperating to form a complete picture.

2. A drawing card comprising a plurality of sheets secured together, the topmost sheet being without configurations thereon and the other sheets each having various artistic matter disposed on its upper surface.

3. A picture card comprising a plurality of thin sheets secured in stacked relation with picture representations on the top sides of each of said sheets and openings in certain of the sheets exposing picture representations on the under sheets with all of the exposed picture representations cooperating to form a finished picture.

4. The method of making pictures which consists in securing a plurality of sheets in stacked relation with picture representations on the top side of each of said sheets, then cutting away a portion of an upper sheet to expose picture representations on a lower sheet so that the picture representations on the lower sheet exposed through said opening will cooperate with the picture representations on the top sheet to form a complete picture.

5. The method of making pictures consisting in making background representations all over one sheet, then securing a plane sheet over the background representations on the first-mentioned sheet and making the main portion of the desired picture on said plane sheet, and finally cutting away portions of said plane sheet where the background representations are to appear, exposing the background representations on the first-mentioned sheet.

In testimony whereof I have signed my name to this specification on this 11th day of April, A. D. 1922.

H. Q. R. CROWDER.